(12) United States Patent
Chockalingam et al.

(10) Patent No.: US 11,403,192 B1
(45) Date of Patent: Aug. 2, 2022

(54) ENABLING POINT-IN-TIME RECOVERY FOR DATABASES THAT CHANGE TRANSACTION LOG RECOVERY MODELS

(71) Applicant: EMC IP Holding Company LLC, Hopkinton, MA (US)

(72) Inventors: Elango Chockalingam, Bangalore (IN); Jigar Bhanushali, Valsad (IN); Sunder Ramesh Andra, Bangalore (IN); Amarendra Behera, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 596 days.

(21) Appl. No.: 15/661,908

(22) Filed: Jul. 27, 2017

(51) Int. Cl.
*G06F 16/11* (2019.01)
*G06F 16/17* (2019.01)
*G06F 11/14* (2006.01)

(52) U.S. Cl.
CPC ...... *G06F 11/1474* (2013.01); *G06F 11/1451* (2013.01); *G06F 11/1461* (2013.01); *G06F 11/1464* (2013.01); *G06F 16/11* (2019.01); *G06F 16/17* (2019.01); *G06F 2201/87* (2013.01)

(58) Field of Classification Search
CPC ................. G06F 11/1474; G06F 11/1451
See application file for complete search history.

(56) References Cited

U.S. PATENT DOCUMENTS

| | | | | |
|---|---|---|---|---|
| 10,303,564 | B1* | 5/2019 | Gupta | G06F 16/28 |
| 2014/0108352 | A1* | 4/2014 | Ahrens | G06F 11/1456 |
| | | | | 707/645 |
| 2015/0019496 | A1* | 1/2015 | Stewart | G06F 16/219 |
| | | | | 707/649 |
| 2016/0077923 | A1* | 3/2016 | Zhang | G06F 16/1844 |
| | | | | 707/645 |
| 2016/0314162 | A1* | 10/2016 | Tarta | G06F 16/2456 |
| 2017/0132091 | A1* | 5/2017 | Leshinsky | G06F 11/0727 |

* cited by examiner

*Primary Examiner* — Son T Hoang
(74) *Attorney, Agent, or Firm* — Dergosits & Noah LLP; Todd A. Noah (57) ABSTRACT

Enabling point-in-time recovery for databases which change transaction log recovery models is described. If a database is associated with a recovery model that creates independent backups of the database's transaction log, a system identifies most recent backup information and a current transaction log sequence number. If the most recent backup information includes a transaction log sequence number and the current transaction log sequence number is a reset value, the system creates a full backup of the database, without first creating any independent backup of the transaction log. The system creates an independent backup of the transaction log when the independent backup of the transaction log is scheduled next, subsequent to creating the full backup of the database.

17 Claims, 3 Drawing Sheets

ENABLING POINT-IN-TIME RECOVERY FOR DATABASES THAT CHANGE TRANSACTION LOG RECOVERY MODELS

BACKGROUND

A database can be an organized collection of the quantities, characters, and/or symbols on which operations are performed by a computer, being stored and transmitted in the form of electrical signals and being recorded on magnetic, optical, and/or mechanical recording media. A database system can be computer software and/or hardware that interacts with a user and software applications to capture and analyze the quantities, characters, and/or symbols on which operations are performed by a computer, being stored and transmitted in the form of electrical signals and being recorded on magnetic, optical, and/or mechanical recording media. A general-purpose database system is designed to enable the definition, creation, querying, update, and administration of databases. Well-known database systems include Microsoft® SQL Server, MySQL, PostgreSQL, MemSQL, SQLite, IBM DB2, Oracle, MongoDB, MariaDB, Sybase, and SAP HANA.

A transaction log can be a systematic record of a database system's instructions and the corresponding database modifications. If a database system failure occurs, a transaction log may be used to recover the database to a consistent state. Checkpoints create known good points from which to begin applying transaction logs during database recovery. A transaction log supports individual transaction recovery, recovery of all uncommitted transactions when the database system is started, rolling a restored database or restored database subcomponent forward to any user-specified recovery point, and/or any of transactional replication, high availability solutions, and disaster recovery solutions, such as always-on availability groups, database mirroring, and log shipping. A transaction log may be implemented as a separate file or a set of files in a database. A database administrator can enable transaction log files to expand automatically by setting a file growth value for a transaction log, which reduces the potential of running out of storage space for the transaction log, while at the same time reducing administrative overhead. The mechanism to reuse the storage space for a transaction log is quick and has minimal effect on transaction throughput.

Transaction log truncation frees storage space for a transaction log, thereby enabling reuse by the transaction log. A transaction log may be regularly truncated to keep the transaction log from filling the allotted storage space. Transaction log size may be monitored because several factors can delay transaction log truncation. Transaction log truncation deletes inactive virtual transaction log files from the logical transaction log of a database, freeing storage space in the logical transaction log for reuse by the physical transaction log. If a transaction log is not truncated, the transaction log can eventually fill all the storage space allocated to the physical transaction log. To avoid running out of storage space, transaction log truncation can occur automatically after a checkpoint and/or automatically after any transaction log backup. A backup can be an extra copy of data in case the original copy of the data is lost or damaged.

If a software error corrupts a data object, such as a database or a transaction log, or if erroneous data updates the data object, a data protection administrator can restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator can manage a backup/restore application to create backups files of data objects and store the backup files of data objects on multiple storage arrays.

A full database backup backs up an entire database, including part of the transaction log, so that the entire database may be recovered after a full database backup is restored. A full database backup represents the database at the point in time that the backup was created. In a full database restore, the goal is to restore the entire database. The entire database is offline for the duration of the restore. Before any part of the database can come online, all data is recovered to a consistent point in which all parts of the database are at the same point in time and no uncommitted transactions exist. As a database increases in size, full database backups require more time to be created, and require more storage space. Therefore, a database administrator can supplement a full database backup of a large database with a series of differential database backups, which can be a copy of the modifications to a data object since the most recent copy of the entire data object. In contrast to a differential backup, an incremental backup can be a copy of the modifications to a data object since either the most recent copy of the entire data object or the most recent copy of the modifications to the data object.

After a failure or hardware loss affecting a database, the database may be restored to any user-specified recovery point, which may be the point of the database system's failure or any point-in-time that precedes the point of the database system's failure. First, the most recent full database backup is restored. Next, if any differential database backups exist, the most recent differential database backup is restored. Alternatively, if any incremental database backups exist, all of the incremental database backups are restored. Then the subsequent sequence of the transaction log backups is restored to the user-specified recovery point. As each transaction log backup is restored, all the modifications recorded in the transaction log are reapplied during a recovery process that rolls forward the corresponding transactions. When the transaction log backup that includes the user-specified recovery point is used to recover the database up to the user-specified recovery point, the transaction log backup's information is used to roll back all transactions that were not committed at that point-in-time.

Some database system's backup and restore operations occur within the context of a database's recovery model. A recovery model can be a design to control transaction log maintenance for a database. A recovery model may be implemented as a database property that controls how transactions are logged, whether the transaction log requires (and allows) backing up, and what kinds of restore operations are available. Recovery models can include a full recovery model, a simple recovery model, and a bulk-logged recovery model. Typically, a database uses the full recovery model and/or the simple recovery model. A database administrator may switch a database as needed between recovery models at any time.

A full recovery model can be a design that controls transaction log maintenance for a database by creating subsequent backups of a transaction log only. A backup that is created of only a transaction log can be referred to as an independent backup of a transaction log because such a backup of a transaction log is independent of the database since the backup of the transaction log does not include a backup of the database itself. Example of independent backups of transaction logs can include an incremental backup of a transaction log and a differential backup of a transaction log. Under the full recovery model, after the database backup or backups are restored, all subsequent transaction log backups are restored. The transaction log backups may be used to recover a database to a user-specified recovery point within one of the transaction log backups. The recovery point can be a specific date and time, a marked transaction, a transaction log mark, and/or a transaction log sequence number. Typically, recovering a database to a user-specified recovery point involves backing up the active transaction log, which may be referred to as the tail of the transaction log, thereby creating a tail-log backup. Restoring the most recent differential database backup can reduce the number of transaction log backups that must be restored. This database restoration involves restoring a database backup, any subsequent differential database backup, and every transaction log backup taken after any differential database backup, including the tail-log backup, up to and including the user-specified recovery point.

The following example of a typical point-in-time recovery is based on a database system for which a full database backup is created daily at 1:00 A.M., after which a differential database backup is created every hour throughout the day, and an incremental backup of the transaction log is created every 10 minutes throughout the day. To recover the database to the state that it was in at 9:19 A.M. Wednesday, a database administrator restores the full database backup that was created Wednesday at 1:00 A.M., restores the differential database backup that was created at 9:00 A.M. on Wednesday, restores and applies the transaction log backup that was created at 9:10 A.M. on Wednesday, and restores and applies the transaction log backup that was created 9:20 A.M. on Wednesday, specifying that the recovery process applies only to transactions that occurred before 9:19 A.M. on Wednesday.

A simple recovery model can be a design that controls transaction log maintenance for a database by reclaiming transaction log storage space after a transaction is committed, instead of creating subsequent backups of a transaction log only. When a database is set to the simple recovery model, the database system automatically reclaims transaction log storage space to keep transaction log storage space requirements small, essentially eliminating the need to manage the transaction log storage space. Every transaction is still written to a transaction log file, but once a transaction is committed as the transaction's data is written to the database, the storage space that was used for the transaction log file is now reusable by new transactions. Since transaction log files are overwritten when this storage space is reused, the transaction log files that could have enabled a recovery to any user-specified recovery point cannot be backed up, such that the most recent recovery point will either be the most recent full database backup, the most recent differential database backup, or the most recent incremental database backup. Therefore, the simple recovery model does not support operations that require transaction log backups, such as log shipping, always-on availability groups, database mirroring, media recovery without data loss, and point-in-time recovery.

Under the simple recovery model, following each full database backup and each differential or incremental database backup, the database is exposed to potential work loss if a database system failure occurs. The work-loss exposure increases with each database modification until the next database backup, when the work-loss exposure returns to zero and a new cycle of work-loss exposure starts. Work-loss exposure increases over time between database backups. Since database modifications since the most recent database backup are unprotected, any desired database modifications would have to be manually recreated in the event of a database system failure. A database administrator may choose the simple recovery model for a database for various reasons, such as if the data is not critical and may easily be recreated, the database is only used for test or development, the data is static and does not change, losing any or all transactions since the last backup is not a problem, the data is derived and may easily be recreated, and/or if the transaction log has completely filled its corresponding allotment of storage space.

A bulk-logged recovery model can be a design that controls log maintenance for a database by creating subsequent backups of a transaction, and also by reducing transaction log space usage through minimal logging for some bulk operations. Minimal logging involves recording only the information that is required to recover a corresponding transaction without directly supporting point-in-time recovery. In contrast to using the full recovery model that completely logs all bulk operations, a database administrator may minimize the transaction logging for a set of bulk operations by temporarily switching the database to the bulk-logged recovery model for bulk operations. Minimal logging is more efficient than complete logging, and it reduces the possibility of a large-scale bulk operation filling the available transaction log storage space during a bulk transaction. However, if a database system failure occurs while minimal logging is in effect, the database may not be recoverable to the point of failure. Since some bulk-logged operations that occurred since the most recent transaction log backup could be lost, any desired database modifications since that last transaction log backup might have to be manually recreated. Otherwise, no transactions are lost. Although the bulk-logged recovery model supports recovery to the end of any database backup, point-in-time recovery is not directly supported.

DETAILED DESCRIPTION

If a database's transaction log has completely filled its corresponding allotment of storage space, a database administrator can address this shortage of storage space for the transaction log by temporarily changing the database's setting from the full recovery model to the simple recovery model, which does not support point-in-time recovery for the database. After the shortage of storage space for the database's transaction log has been addressed, such as by expanding the available storage space for the database's transaction log, the database administrator can return the database's setting from the simple recovery model to the full recovery model, which normally supports point-in-time recovery for the database. However, changing the database's setting from the simple recovery model to the full recovery model does not enable all point-in-time recoveries for the database.

When the database administrator changed the database's setting from the full recovery model to the simple recovery model, the transaction log sequence number was reset from an ever-increasing transaction log sequence number to an initialized value for the transaction log sequence number, and repeatedly reset to the initialized value as long as the database remained in the simple recovery model. When the database administrator returned the database's setting from the simple recovery model to the full recovery model, the transaction log sequence number began increasing again, but the increasing transaction log sequence numbers began from the initialized value for the transaction log sequence number. A problem subsequently occurs when a backup/restore application creates the next scheduled incremental backup of the transaction log because no transaction log sequence numbers exist for some transactions and because all of the existing transaction log sequence numbers are not in an ever-increasing sequence. No transaction log sequence numbers exist for any of the transactions that were committed while the database was temporarily set to the simple recovery model because a transaction's transaction log storage space is reclaimed after these transactions are committed, thereby resetting the corresponding transaction log sequence numbers and over-writing all of the information about these transactions' existence. Furthermore, all of the existing transaction log sequence numbers are no longer in an ever-increasing sequence because the transaction sequence number of the last transaction that was backed up via the last database backup is now sequentially followed by the reinitialized and therefore smaller transaction sequence number of the current transaction that will be backed up via the next scheduled incremental backup of the transaction log. Consequently, when the backup/restore application attempts to recover the database to a point-in-time that is subsequent to the database's setting change from the simple recovery model to the full recovery model, the backup/restore application restores the most recent database backup and the subsequent backups of the database's transaction log. However, since this combination of restored backups lacks all information for the transactions that occurred when the database was set to the simple recovery model, and the recovery of transactions is based on transaction log sequence numbers that are suddenly reset to an initialized transaction log sequence number, the recovery process malfunctions because the recovery process is designed to process ever-increasing transaction log sequence numbers. The attempted point-in-time recovery fails due to the gap that exists between the transaction log information and the transaction log sequence numbers in the most recent database backup and the transaction log information and the transaction log sequence numbers in the backup of the transaction log that is created after the database's setting changes from the simple recovery model to the full recovery model.

The following example of a typical point-in-time recovery failure is based on a database system for which a full database backup is created daily at 1:00 A.M., after which a differential database backup is created every hour throughout the day, and an incremental backup of the transaction log is created every 10 minutes throughout the day. A scheduled full database backup is created of a database at 1:00 A.M. on Wednesday, and the most recent scheduled differential backup of the database is created at 9:00 A.M. on Wednesday. At 9:04 A.M. on Wednesday, the database's transaction log has completely filled its corresponding allotment of storage space, and a database administrator temporarily changes the database's setting from the full recovery model to the simple recovery model. At 9:06 A.M. on Wednesday, the allotment of storage space for the database's transaction log has been expanded, and the database administrator returns the database's setting from the simple recovery model to the full recovery model. At 9:10 A.M. and 9:20 A.M. on Wednesday, scheduled incremental backups are created of the database's transaction log.

To recover the database to the state that is was in at 9:19 A.M. Wednesday, a database administrator restores the full database backup that was created Wednesday at 1:00 A.M., restores the differential database backup that was created at 9:00 A.M. on Wednesday, and restores the incremental backups of the transaction log that were created at 9:10 A.M. on Wednesday and 9:20 A.M. on Wednesday, specifying that the recovery process applies only to transactions that occurred before 9:19 A.M. on Wednesday. However, the restored incremental backup of the transaction log that was created at 9:10 A.M. on Wednesday has gaps in transaction log information and transaction log sequence numbers. No transaction log information exists for the transactions that were committed from 9:04 A.M. on Wednesday to 9:06 A.M. on Wednesday when the database was set to the simple recovery model. Additionally, changing the database's setting to the simple recovery model also overwrote all of the transaction information for the transactions that were committed from 9:00 A.M. on Wednesday to 9:04 A.M. on Wednesday before any incremental backups were created of the transaction log. Additionally, the last transaction that was backed up by the differential database backup at 9:00 A.M. on Wednesday had the transaction log sequence number of 171, and the next transaction that was backed up by the incremental backup of the transaction log at 9:10 A.M. on Wednesday had the reset transaction log sequence number of 0. When the backup/restore application attempts to recover the transactions specified by the incremental backup of the transaction log at 9:10 A.M. on Wednesday, the recovery process malfunctions because the transaction log sequence number of 171 is followed by the reset transaction log sequence number of 0 rather than the expected transaction log sequence number of 172, or any transaction log sequence number that is greater than 171.

Embodiments herein enable point-in-time recovery for databases which change transaction log recovery models. If a database is associated with a recovery model that creates independent backups of the database's transaction log, a system identifies most recent backup information and a current transaction log sequence number. If the most recent backup information includes a transaction log sequence number and the current transaction log sequence number is a reset value, the system creates an unscheduled full backup of the database, without first creating any independent backup of the transaction log. Subsequent to creating the unscheduled full backup of the database, the system creates an independent backup of the transaction log when the independent backup of the transaction log is scheduled next.

For example, since a SQL database is set to the full RModel that creates incremental backups of the SQL database's transaction log, the backup/restore application identifies the backup catalog's most recent transaction log sequence number of 171 and the current transaction log sequence number of 0. Since the backup catalog's most recent backup information identifies a transaction log sequence number and the current transaction log sequence number of 0 is a reset value, the backup/restore application creates an unscheduled full backup of the SQL database, without first creating any incremental backup of the SQL database's transaction log. After creating the unscheduled full backup of the SQL database, the backup/restore application creates an incremental backup of the SQL database's transaction log when the incremental backup of the SQL database's transaction log is scheduled next.

Figure 1:
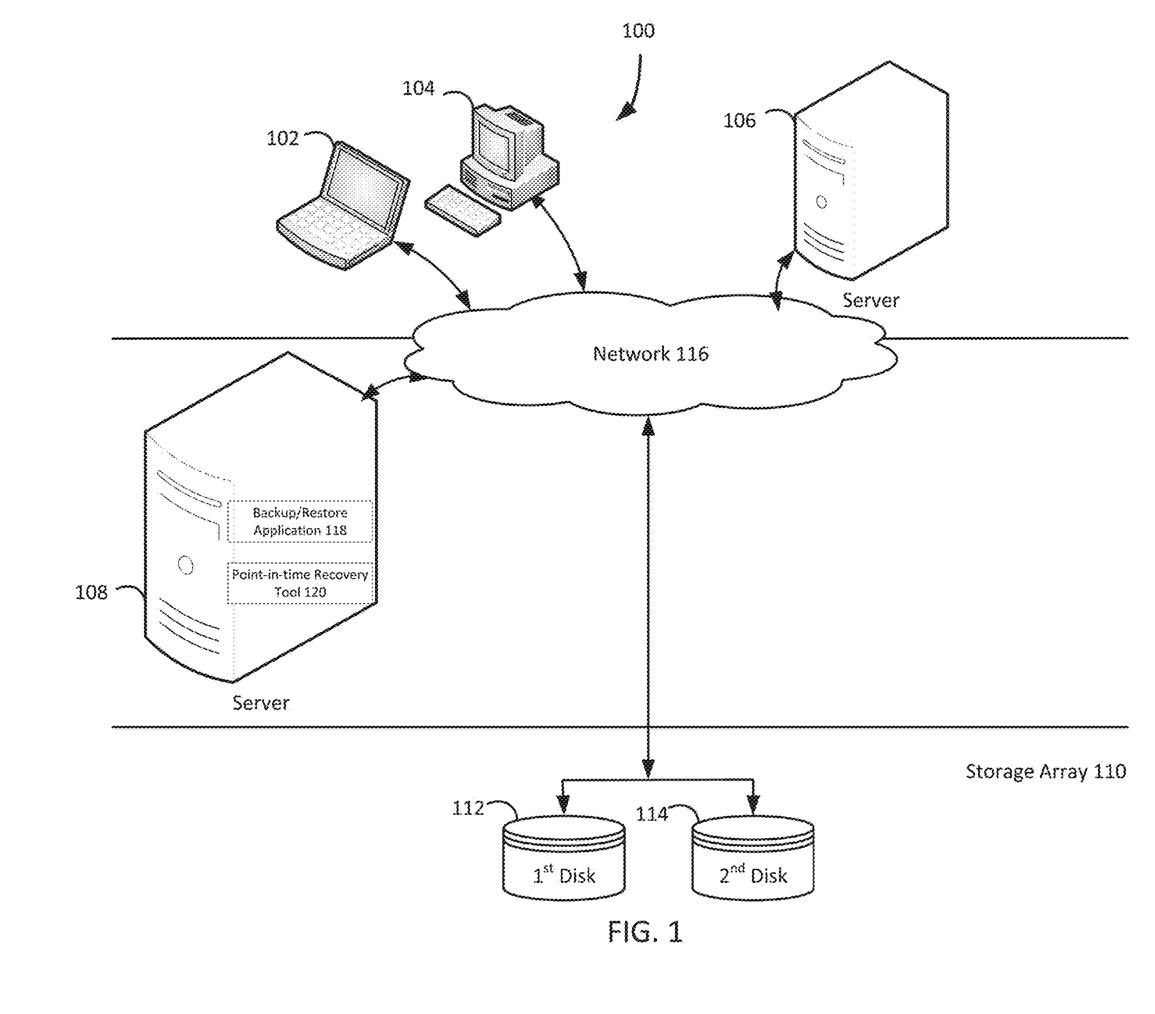
FIG. 1 illustrates a block diagram of an example system for enabling point-in-time recovery for databases which change transaction log recovery models, under an embodiment.

FIG. 1 illustrates a diagram of a system that enables point-in-time recovery for databases which change transaction log recovery models, under an embodiment. As shown in FIG. 1, a system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108, and a storage array 110 that may be provided by a hosting company. Although FIG. 1 depicts the first client 102 as a laptop computer 102, the second client 104 as a personal computer 104, and the third client 106 as a database server 106, each of the clients 102-106 may be any type of computer. The storage array 110 includes a first disk 112 and a second disk 114. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 can each be substantially similar to the system 300 depicted in FIG. 3 and described below.

The server 108, which may be referred to as a backup server 108, includes a backup/restore application 118 that can use a point-in-time recovery tool 120 to create backup files of data objects for the clients 102-106, and execute a rollback based on the backup files. Since the point-in-time recovery tool 120 may be integrated into or separate from the backup/restore application 118, any actions described as being executed by the backup/restore application 118 may be executed by any combination of the point-in-time recovery tool 120 and the backup/restore application 118. The backup/restore application 118 may provide centralized administration, such as scheduling, monitoring, and managing backup operations and backup files. The backup/restore application 118 can enable the storing of backup operation schedules, client policies, and client configurations. The backup/restore application 118 may provide a unique interface to the clients 102-106 during login, and assist the backup server 108 in authenticating and registering the clients 102-106. The backup/restore application 118 can send backup/restore work orders to the clients 102-106, which may receive and process the work orders to start a backup or restore operation. The backup/restore application 118 maintains a local database of all processes that execute on the backup server 108. The backup/restore application 118 executes server-side processes for a system administrator's graphical management console, which may enable the system administrator to use command line interface tools for queries. For example, a system administrator identifies the clients 102-106 registered with the backup server 108.

Although FIG. 1 depicts the backup/restore application 118 and the point-in-time recovery tool 120 residing completely on the backup server 108, any combination of the backup/restore application 118 and the point-in-time recovery tool 120 may reside in any combination of partially on the backup server 108 and partially on the clients 102-106, such as by residing as data management applications on the clients 102-106. Even though the following paragraphs describe EMC Corporation's Avamar® backup/restore application and EMC Corporation's NetWorker® backup/restore application as examples of the backup/restore application 118, the backup/restore application 118 may be any other backup/restore application which provides the backup/restore functionalities described in the Background section.

The backup/restore application 118 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 118 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The following example of an enabled point-in-time recovery for databases that change recovery models is based on a database system for which a full database backup is created daily at 1:00 A.M., after which a differential database backup is created every hour throughout the day, and an incremental backup of the transaction log is created every 10 minutes throughout the day. A scheduled full database backup is created of a database at 1:00 A.M. on Wednesday, and the most recent scheduled differential backup of the database is created at 9:00 A.M. on Wednesday. At 9:04 A.M. on Wednesday, the database's transaction log has completely filled its corresponding allotment of storage space, and a database administrator temporarily changes the database's setting from the full recovery model to the simple recovery model. At 9:06 A.M. on Wednesday, the allotment of storage space for the database's transaction log has been expanded, and the database administrator returns the database's setting from the simple recovery model to the full recovery model. At 9:10 A.M. and 9:20 A.M. on Wednesday, incremental backups are scheduled to be created of the database's transaction log.

The system 100 determines whether a database is associated with a recovery model that creates independent backups of a transaction log associated with the database. For example and without limitation, this can include the backup/restore application 118 identifying that a workflow flag indicates that a SQL database is set to the full RModel that creates incremental backups of the SQL database's transaction log. Although a bulk-logged recovery model does not directly support a point-in-time recovery, the backup/restore application 118 can use a minimally-logged transaction log's information about a transaction log mark created by a database administrator at a particular time to approximate a point-in-time recovery via a recovery process that continues until the transaction log marked at that particular time. Although a database system may not allow a database administrator to change a database's setting from a simple recovery model to a bulk-logged recovery model without first changing to a full recovery model, or allow a change from a bulk-logged recovery model to a simple recovery model without first changing to a full recovery model, another database system may allow a direct change from a simple recovery model to a bulk-logged recovery model and/or a direct change from a bulk-logged recovery model to a simple recovery model.

If a database is associated with a recovery model that creates independent backups of the database's transaction log, the system 100 identifies the most recent backup information and the current transaction log sequence number. By way of example and without limitation, this can include the backup/restore application 118 identifying the backup catalog's most recent transaction log sequence number of 171 and the current transaction log sequence number of 0 because the SQL database is set to the full RModel that creates incremental backups of the SQL database's transaction log. The backup/restore application 118 uses the most recent transaction log sequence number and the current transaction log sequence number to identify the previous and current states of backing up the transaction log. Identifying these states enables the backup/restore application 118 to determine whether to create an unscheduled full backup of the database, which would enable a point-in-time recovery for the database. When the backup/restore application 118 creates a backup of a data object, such as a full backup of a database, a differential backup of a database, an incremental backup of a database, an incremental backup of a transaction log, or a differential backup of a transaction log, the backup/restore application 118 records information about the backup. This backup information may include the time that the backup was created and the transaction log sequence number of the most recent transaction that was backed up, and may be stored in persistent storage, such as in a backup catalog. The backup/restore application 118 can subsequently use the backup information's most recently stored transaction log to determine if the database's transaction logs have ever been backed up. When a database administrator changes a database's setting to a simple recovery model, the database system resets the previously increasing transaction log sequence number to a rest value, such as the number zero, and continuously resets the transaction log sequence number to the reset value after each corresponding transaction is committed. The backup/restore application 118 can subsequently use the value of the current transaction log sequence number to determine whether the database administrator has recently changed the database's setting to the simple recovery model.

A transaction log sequence number can be an ordered identifier of a systematic record of a database system's instructions and the corresponding database modifications. A current transaction log sequence number can be the present time's ordered identifier of a systematic record of a database system's instructions and the corresponding database modifications. Most recent backup information can be a record of the latest copy of a data object.

If the database is not associated with a recovery model that creates independent backups of the transaction log, the system 100 can create another full backup of database when the other full backup of database is scheduled next. In embodiments, this can include the backup/restore application 118 creating a full backup of the SQL database at 1:00 A.M. Thursday. When the database administrator has changed the database's setting to the simple recovery model that does not create incremental backups of the transaction log, the backup/restore application 118 simply waits to create the next full database backup whenever the next full database backup is normally scheduled. A full backup can be a copy of an entire data object as the entire data object existed at a point in time.

Having identified transaction information, the system 100 determines whether the most recent backup information includes a transaction log sequence number and the current transaction log sequence number is a reset value. For example and without limitation, this can include the backup/restore application 118 determining that the backup catalog's most recent backup information identifies the transaction log sequence number of 171 and the current transaction log sequence number of 0 is a reset value. If the backup catalog's most recent backup information stores a transaction log sequence number, instead of an empty value, the backup/restore application 118 determines that backups have been previously created of the database and/or the database's transaction logs, which may indicate the need to create an unscheduled full backup of the database to enable point-in-time recovery for the database. If the current transaction log sequence number is a reset value, the backup/ restore application 118 determines that backups have stopped being created of the database's transaction logs, which may indicate the need to create an unscheduled full backup of the database to enable point-in-time recovery for the database. A reset value can be an initialization value associated with a transaction log sequence number.

If the most recent backup information includes a transaction log sequence number and the current transaction log sequence number is a reset value, the system 100 creates an unscheduled full backup of the database, without first creating any independent backup of the transaction log. By way of example and without limitation, this can include the backup/restore application 118 creating a full backup of the SQL database at 9:10 A.M. on Wednesday, without first creating any incremental backup of the SQL database's transaction log, because the backup catalog's most recent backup information identifies the transaction log sequence number of 171 and the current transaction log sequence number of 0 is a reset value. The creation of the unscheduled full backup of the database eliminates any gap in the backups for transactions and transaction log sequence numbers, such that any subsequent independent backups created of the transaction log will be applied to the unscheduled full backup of the database, which currently reflects the state of the database. Consequently, any requested point-in-time recovery to a point in time that is after the creation of the unscheduled full backup of the database will encounter no gaps for transactions or transaction log sequence numbers, thereby resulting in the requested point-in-time recovery.

If backup/restore application 118 had not created the unscheduled full backup of the database, the incremental backup of the transaction log that would be created at 9:10 A.M. on Wednesday would have gaps in transaction information and transaction log sequence numbers. No transaction information would exist for the transactions that were committed from 9:04 A.M. on Wednesday to 9:06 A.M. on Wednesday when the database was set to the simple recovery model. Additionally, changing the database's setting to the simple recovery model also would overwrite all of the transaction information for the transactions that were committed from 9:00 A.M. on Wednesday to 9:04 A.M. on Wednesday before any incremental backups were created of the transaction log. Furthermore, the last transaction information that was backed up by the differential database backup at 9:00 A.M. on Wednesday had the transaction log sequence number of 171, and the next transaction information that was backed up by the incremental backup of the transaction log at 9:10 A.M. on Wednesday had the reset transaction log sequence number of 0. If the backup/restore application 118 would have attempted to recover the transactions specified by the incremental backup of the transaction log at 9:10 A.M. on Wednesday without the creation of the unscheduled full backup of the database, the recovery process would malfunction because the transaction log sequence number of 171 would be followed by the reset transaction log sequence number of 0 rather than the expected transaction log sequence number of 172, or any transaction log sequence number that is greater than 171.

If the most recent backup information does not include a transaction log sequence number or the current transaction log sequence number is not a reset value, the system 100 can create another independent backup of the database's transaction log when the other independent backup of the database's transaction log is scheduled next. In embodiments, this can include the backup/restore application 118 creating an incremental backup of the SQL database's transaction log at 9:10 A.M. on Wednesday when the incremental backup of the SQL database's transaction log is scheduled next. If the most recent backup information does not include a transaction log sequence number, the backup/restore application 118 determines that no backups have been created yet for the database and/or the database's transaction log, which indicates that the database has been initialized very recently, such that no need exists to create a full backup of the recently initialized database until the next full backup is scheduled. However, a need exists to create an independent backup of the recently initialized database's transaction log whenever the next independent backup is scheduled for the database's transaction log. If the current transaction log sequence number is not a reset value, the database administrator has not changed the database's setting to the simple recovery model that resets the transaction log sequence number, which indicates that the transaction log sequence numbers are increasing as expected, such that no need exists to create a full backup of the recently initialized database until the next full backup is scheduled. However, a need exists to create an independent backup of the database's transaction log whenever the next independent backup is scheduled for the database's transaction log.

Subsequent to creating the unscheduled full backup of the database, the system 100 creates an independent backup of the transaction log when the independent backup of the transaction log is scheduled next. For example and without limitation, this can include the backup/restore application 118 creating an incremental backup of the SQL database's transaction log at 9:20 A.M. on Wednesday when the incremental backup of the SQL database's transaction log is scheduled next, after creating the unscheduled full backup of the SQL database. The creation of the scheduled incremental backup of the database's transaction log combined with the creation of the unscheduled full backup of the database enables a point-in-time recovery to any point in time between the creations of these backups or after the creations of these backups because the creation of the unscheduled full backup of the database eliminated any potential gaps that may have previously existed in the transaction information.

After enabling a point-in-time recovery for a database, the system 100 can receive a request to recover the database to a point-in-time before creation of an independent backup of database's transaction log and after creation of a unscheduled full backup of database. By way of example and without limitation, this can include the backup/restore application 118 receiving a request to return the SQL database to the state that it was in at 9:19 A.M. Wednesday. A request can be an act of asking formally for something. A point-in-time can be a particular instant, minute, moment, or second. After receiving a point-in-time recovery request for a database, the system 100 can recover the database to the point-in-time by restoring the unscheduled full backup of database and the independent backup of database's transaction log. In embodiments, this can include the backup/restore application 118 restoring the Wednesday 9:10 A.M unscheduled full backup of database and the Wednesday 9:20 incremental backup of database's transaction log, and using the Wednesday 9:20 incremental backup of database's transaction log to recover the SQL database to the state that it was in at 9:19 A.M. Wednesday.

Figure 2:
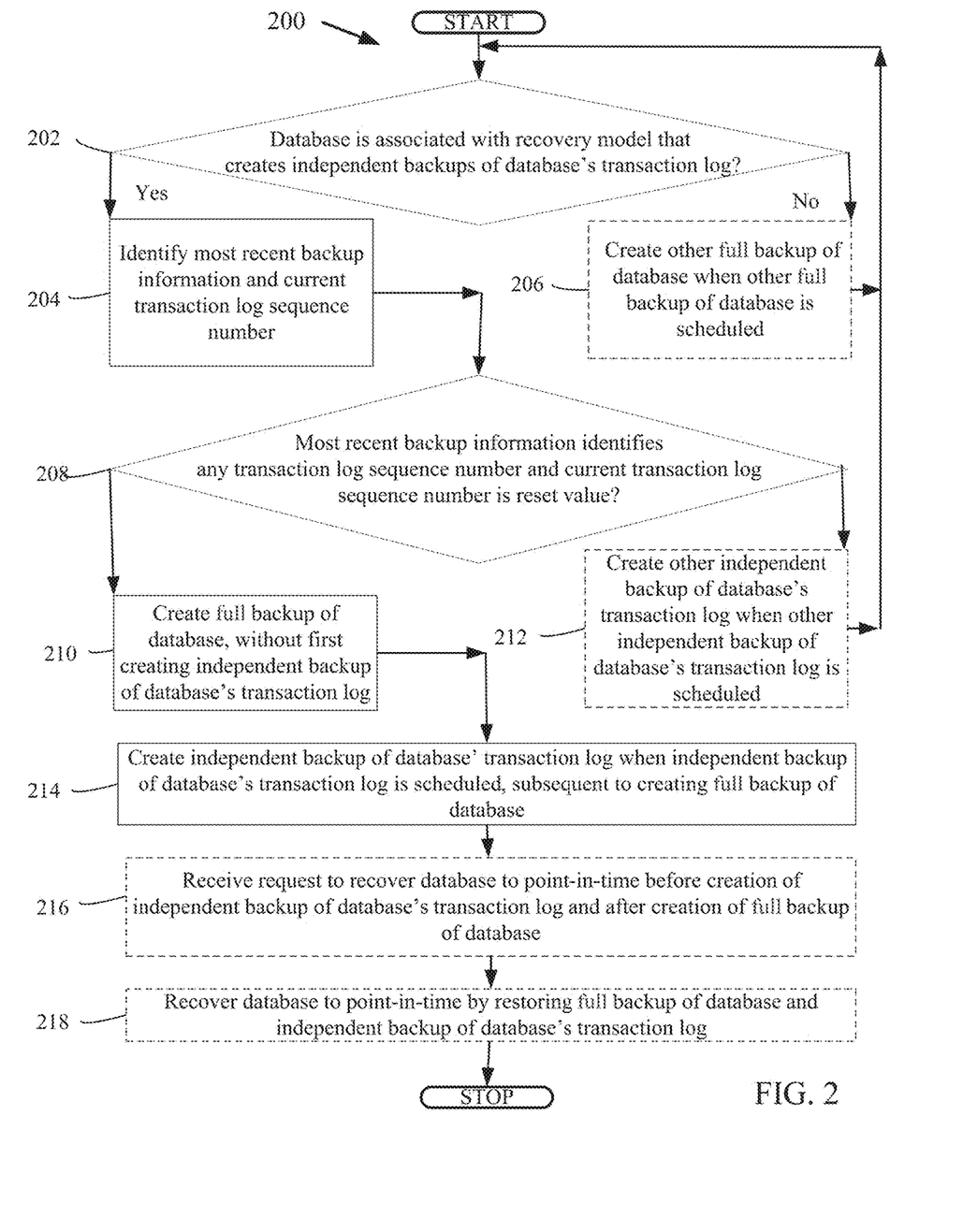
FIG. 2 is a flowchart that illustrates a method of enabling point-in-time recovery for databases which change transaction log recovery models, under an embodiment.

FIG. 2 is a flowchart that illustrates a method for enabling point-in-time recovery for databases which change transaction log recovery models, under an embodiment. Flowchart 200 illustrates method acts illustrated as flowchart blocks for certain steps involved in and/or between the clients 102-106 and/or the server 108 of FIG. 1.

A determination is made whether a database is associated with a recovery model that creates independent backups of a transaction log associated with the database, block 202. The system 100 determines whether independent backups are being created of a transaction log because such backups are required for a current point-in-time recovery. For example and without limitation, this can include the backup/restore application 118 identifying that a workflow flag indicates that a SQL database is set to the full RModel that creates incremental backups of the SQL database's transaction log. If the database is associated with a recovery model that creates independent backups of the transaction log, the flowchart 200 continues to block 202 to identify the most recent backup information and the current transaction log sequence number. If the database is not associated with a recovery model that creates independent backups of the transaction log, the flowchart 200 proceeds to block 204 to create a full backup of the database when scheduled next.

If the database is associated with a recovery model that creates independent backups of the transaction log, the most recent backup information and the current transaction log sequence number are identified, block 204. The system 100 identifies transaction information which could indicate that a current point-in-time recovery should be enabled. By way of example and without limitation, this can include the backup/restore application 118 identifying the backup catalog's most recent transaction log sequence number of 171 and the current transaction log sequence number of 0, because the SQL database is set to the full RModel that creates incremental backups of the SQL database's transaction log. Then the flowchart 200 continues to block 208 to evaluate the identified transaction information.

If the database is not associated with a recovery model that creates independent backups of the transaction log, another full backup of database is optionally created when the other full backup of database is scheduled next, block 206. The system 100 creates the next full database backup on schedule because a current point-in-time recovery is disabled. In embodiments, this can include the backup/restore application 118 creating a full backup of the SQL database at 1:00 A.M. Thursday. Then the flowchart 200 returns to block 202 to check for changes in the database's recovery model.

Having identified the specified transaction information, a determination is made whether the most recent backup information includes any transaction log sequence number and the current transaction log sequence number is a reset value, block 208. The system 100 determines whether the identified transaction information indicates that a current point-in-time recovery should be enabled. For example and without limitation, this can include the backup/restore application 118 determining that the backup catalog's most recent backup information identifies the transaction log sequence number of 171 and the current transaction log sequence number of 0 is a reset value. If the most recent backup information includes any transaction log sequence number and the current transaction log sequence number is a reset value, the flowchart 200 continues to block 210 to create an unscheduled full backup of the database. If the most recent backup information does not include any transaction log sequence number or the current transaction log sequence number is not a reset value, the flowchart 200 proceeds to block 212 to create an independent backup of the database's transaction log when scheduled next.

If the most recent backup information includes any transaction log sequence number and the current transaction log sequence number is a reset value, a full backup of the database is created, without first creating any independent backup of the transaction log, block 210. The system 100 creates an unscheduled full database backup to enable a current point-in-time recovery. By way of example and without limitation, this can include the backup/restore application 118 creating a full backup of the SQL database at 9:10 A.M. on Wednesday, without first creating any incremental backup of the SQL database's transaction log because the backup catalog's most recent backup information identifies the transaction log sequence number of 171 and the current transaction log sequence number of 0 is a reset value. Then the flowchart 200 proceeds to block 214.

If the most recent backup information does not include any transaction log sequence number or the current transaction log sequence number is not a reset value, another independent backup of the database's transaction log is optionally created when the other independent backup of the database's transaction log is scheduled next, block 212. The system 100 creates an independent backup of the transaction log as scheduled because a current point-in-time recovery does not need to be enabled. In embodiments, this can include the backup/restore application 118 creating an incremental backup of the SQL database's transaction log at 9:10 A.M. on Wednesday when the incremental backup of the SQL database's transaction log is scheduled next. Then the flowchart 200 returns to block 202 to check for changes in the database's recovery model.

Subsequent to creating the unscheduled full backup of the database, an independent backup of the transaction log is created when the independent backup of the transaction log is scheduled next, block 214. The system 100 creates an independent backup of the transaction log as scheduled. For example and without limitation, this can include the backup/restore application 118 creating an incremental backup of the SQL database's transaction log at 9:20 A.M. on Wednesday when the incremental backup of the SQL database's transaction log is scheduled next, after creating the unscheduled full backup of the SQL database.

After enabling a point-in-time recovery for the database, a request is optionally received to recover the database to a point-in-time before creation of the independent backup of database's transaction log and after creation of the unscheduled full backup of database, block 216. The system 100 receives a request for a point-in-time recovery. By way of example and without limitation, this can include the backup/restore application 118 receiving a request to return the SQL database to the state that it was in at 9:19 A.M. Wednesday.

After receiving a point-in-time recovery request for the database, the database is optionally recovered to the point-in-time by restoring the unscheduled full backup of database and the independent backup of database's transaction log, block 218. The system 100 recovers a database to a point-in-time. In embodiments, this can include the backup/restore application 118 restoring the Wednesday 9:10 A.M unscheduled full backup of database and the Wednesday 9:20 incremental backup of database's transaction log, and using the Wednesday 9:20 incremental backup of database's transaction log to recover the SQL database to the state that it was in at 9:19 A.M. Wednesday.

Although FIG. 2 depicts the blocks 202-218 occurring in a specific order, the blocks 202-218 may occur in another order. In other implementations, each of the blocks 202-218 may also be executed in combination with other blocks and/or some blocks may be divided into a different set of blocks.

Figure 3:
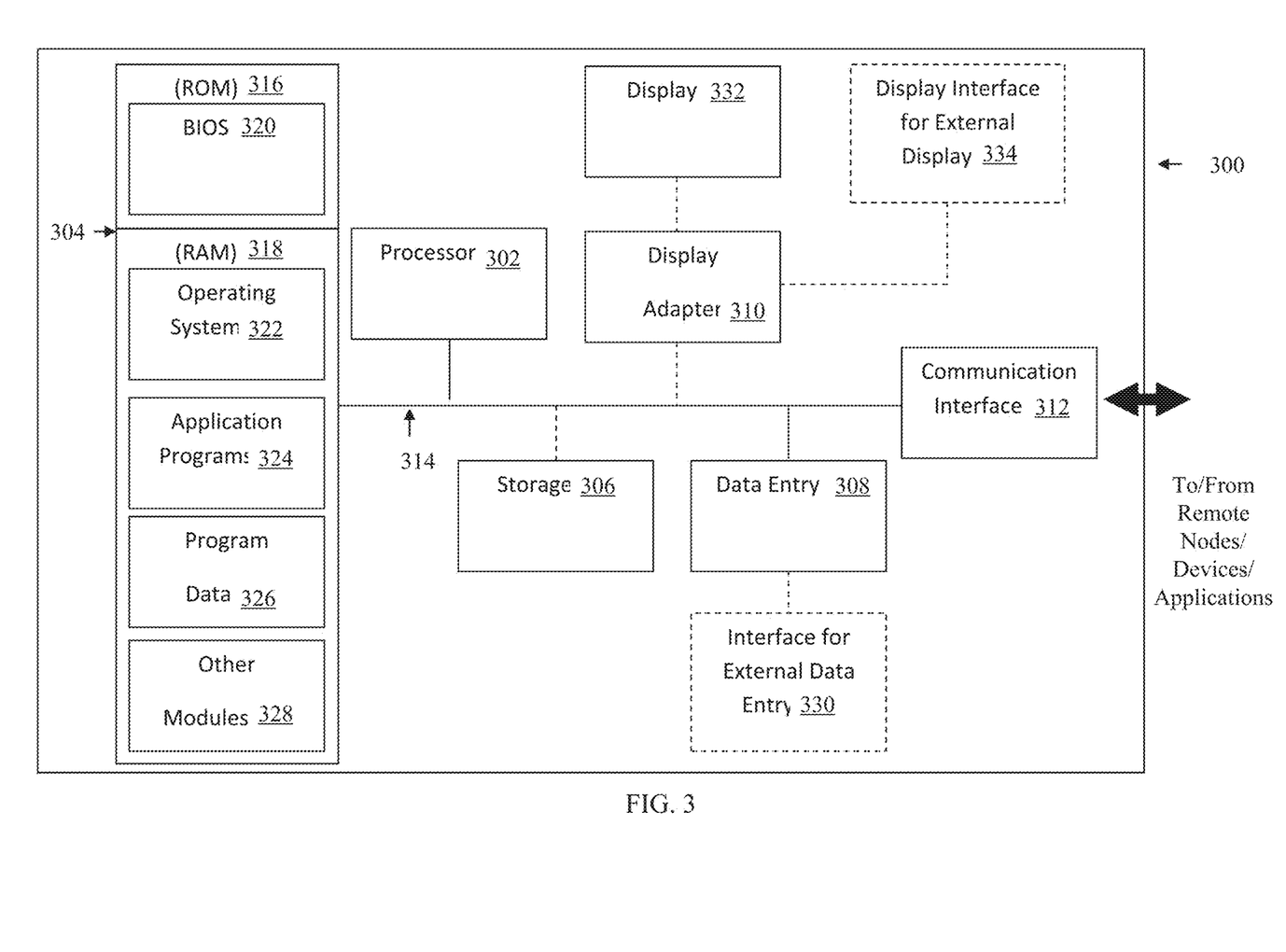
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
one or more processors; and
a non-transitory computer readable medium storing a plurality of instructions, which when executed, cause one or more processors to:
determine whether a database is associated with any recovery model that creates any independent backups of a transaction log associated with the database, the transaction log being a systematic record of instructions of the database and corresponding database modifications;
identify a most recent backup information from a backup catalog that identifies a most recent backup associated with the database and a most current transaction log sequence number from the transaction log in response to a determination that the database is associated with any recovery model that creates any independent backups of the transaction log;
determine whether the most recent backup information from the backup catalog comprises any transaction log sequence number;
determine whether the most current transaction log sequence number is a reset value, the reset value being an initialized value set for the current transaction log sequence number in response to a recovery model being changed to not support point in time recovery for the database, the initialized value resetting the numbering in the transaction log to a number that is less than the transaction log sequence number of the most recent backup;
create a full backup of the database, without first creating any independent backup of the transaction log, in response to a determination that the most recent backup information comprises any transaction log sequence number and the current transaction log sequence number comprises the reset value, where any subsequent independent backups created of the transaction log will be applied to the unscheduled full backup of the database; and
create an independent backup of the transaction log when the independent backup of the transaction log is scheduled next, subsequent to creating the full backup of the database.

2. The system of claim 1, wherein determining whether the database is associated with any recovery model that creates any independent backups of the transaction log comprises determining whether a corresponding workflow flag is set.

3. The system of claim 1, wherein the processor-based application further causes the processor to create another full backup of the database when the other full backup of the database is scheduled in response to a determination that the database is not associated with any recovery model that creates any independent backups of the transaction log.

4. The system of claim 1, wherein the processor-based application further causes the processor to create another independent backup of the transaction log when the other independent backup of the transaction log is scheduled, in response to a determination that at least one of the most recent backup information does not comprise any transaction log sequence number and the current transaction log sequence number does not comprise the reset value.

5. The system of claim 1, wherein the processor-based application further causes the processor to:
  receive a request to recover the database to a point-in-time before the creation of the independent backup of the transaction log and after the creation of the full backup of the database; and
  recover the database to the point-in-time by restoring the full backup of the database and the independent backup of the transaction log.

6. The system of claim 1, wherein the reset value comprises any initialization value associated with a transaction log sequence number.

7. A method comprising:
  determining whether a database is associated with any recovery model that creates any independent backups of a transaction log associated with the database, the transaction log being a systematic record of instructions of the database and corresponding database modifications;
  identifying a most recent backup information from a backup catalog that identifies a most recent backup associated with the database and a most current transaction log sequence number from the transaction log in response to a determination that the database is associated with any recovery model that creates any independent backups of the transaction log;
  determining whether the most recent backup information from the backup catalog comprises any transaction log sequence number;
  determining whether the most current transaction log sequence number is a reset value, the reset value being an initialized value set for the current transaction log sequence number in response to a recovery model being changed to not support point in time recovery for the database, the initialized value resetting the numbering in the transaction log to a number that is less than the transaction log sequence number of the most recent backup;
  creating a full backup of the database, without first creating any independent backup of the transaction log, in response to a determination that the most recent backup information comprises any transaction log sequence number and the current transaction log sequence number comprises the reset value, where any subsequent independent backups created of the transaction log will be applied to the unscheduled full backup of the database; and
  creating an independent backup of the transaction log when the independent backup of the transaction log is scheduled next, subsequent to creating the full backup of the database.

8. The method of claim 7, wherein determining whether the database is associated with any recovery model that creates any independent backups of the transaction log comprises determining whether a corresponding workflow flag is set.

9. The method of claim 7, wherein the method further comprises creating another full backup of the database when the other full backup of the database is scheduled in response to a determination that the database is not associated with any recovery model that creates any independent backups of the transaction log.

10. The method of claim 7, wherein the method further comprises creating another independent backup of the transaction log when the other independent backup of the transaction log is scheduled, in response to a determination that at least one of the most recent backup information does not comprise any transaction log sequence number and the current transaction log sequence number does not comprise the reset value.

11. The method of claim 7, wherein the method further comprises:
  receiving a request to recover the database to a point-in-time before the creation of the independent backup of the transaction log and after the creation of the full backup of the database; and
  recovering the database to the point-in-time by restoring the full backup of the database and the independent backup of the transaction log.

12. The method of claim 7, wherein the reset value comprises any initialization value associated with a transaction log sequence number.

13. A computer program product, comprising a non-transitory computer-readable medium having a computer-readable program code embodied therein to be executed by one or more processors, the program code including instructions to:
  determine whether a database is associated with any recovery model that creates any independent backups of a transaction log associated with the database, the transaction log being a systematic record of instructions of the database and corresponding database modifications;
  identify a most recent backup information from a backup catalog that identifies a most recent backup associated with the database and a most current transaction log sequence number from the transaction log in response to a determination that the database is associated with any recovery model that creates any independent backups of the transaction log;
  determine whether the most recent backup information from the backup catalog comprises any transaction log sequence number;
  determine whether the most current transaction log sequence number is a reset value, the reset value being an initialized value set for the current transaction log sequence number in response to a recovery model being changed to not support point in time recovery for the database, the initialized value resetting the numbering in the transaction log to a number that is less than the transaction log sequence number of the most recent backup;
  create a full backup of the database, without first creating any independent backup of the transaction log, in response to a determination that the most recent backup information comprises any transaction log sequence number and the current transaction log sequence number comprises the reset value, where any subsequent independent backups created of the transaction log will be applied to the unscheduled full backup of the database; and
  create an independent backup of the transaction log when the independent backup of the transaction log is scheduled, subsequent to creating the full backup of the database.

14. The computer program product of claim 13, wherein determining whether the database is associated with any recovery model that creates any independent backups of the transaction log comprises determining whether a corresponding workflow flag is set.

15. The computer program product of claim 13, wherein the program code includes further instructions to create another full backup of the database when the other full backup of the database is scheduled in response to a determination that the database is not associated with any recovery model that creates any independent backups of the transaction log.

16. The computer program product of claim 13, wherein the program code includes further instructions to create another independent backup of the transaction log when the other independent backup of the transaction log is scheduled, in response to a determination that at least one of the most recent backup information does not comprise any transaction log sequence number and the current transaction log sequence number does not comprise the reset value.

17. The computer program product of claim 13, wherein the program code includes further instructions to:
- receive a request to recover the database to a point-in-time before the creation of the independent backup of the transaction log and after the creation of the full backup of the database; and
- recover the database to the point-in-time by restoring the full backup of the database and the independent backup of the transaction log.

* * * * *